United States Patent
Liu et al.

(10) Patent No.: US 11,683,130 B2
(45) Date of Patent: Jun. 20, 2023

(54) METHOD AND DEVICE FOR TRANSMITTING FEEDBACK INFORMATION

(71) Applicant: Telefonaktiebolaget LM Ericsson (publ), Stockholm (SE)

(72) Inventors: Jinhua Liu, Beijing (CN); Zhan Zhang, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 106 days.

(21) Appl. No.: 16/608,908

(22) PCT Filed: May 7, 2018

(86) PCT No.: PCT/CN2018/085785
§ 371 (c)(1),
(2) Date: Oct. 28, 2019

(87) PCT Pub. No.: WO2018/202192
PCT Pub. Date: Nov. 8, 2018

(65) Prior Publication Data
US 2020/0186298 A1      Jun. 11, 2020

(30) Foreign Application Priority Data

May 7, 2018  (WO) ............... PCT/CN2017/083259

(51) Int. Cl.
*H04L 1/1829* (2023.01)
*H04L 1/1607* (2023.01)
(Continued)

(52) U.S. Cl.
CPC .......... *H04L 1/1854* (2013.01); *H04L 1/1607* (2013.01); *H04L 1/1812* (2013.01);
(Continued)

(58) Field of Classification Search
CPC ... H04L 1/1854; H04L 5/0055; H04L 1/1864; H04L 1/1861; H04L 1/1883;
(Continued)

(56) References Cited

U.S. PATENT DOCUMENTS 10,237,909 B2 *  3/2019  Jung ............... H04W 76/19
10,701,677 B2 *  6/2020  Park ............... H04W 74/0816
(Continued)

FOREIGN PATENT DOCUMENTS

CN       1586048 A     2/2005
CN     102377541 A     3/2012
(Continued)

OTHER PUBLICATIONS

A Probability Based Modulation and its Application in Ultra Reliable Low Latency Communications in 5G, Wang et al., IEEE Xplore (Year: 2017).*

(Continued)

*Primary Examiner* — Oussama Roudani
(74) *Attorney, Agent, or Firm* — Christopher & Weisberg, P.A.

(57) ABSTRACT

A method and device for transmitting feedback information. The method includes: determining feedback type information and/or delay information when data is transmitted by a network device; and determining a reliability grade of a feedback transmission or that the feedback transmission is exempted at a certain situation, according to the delay information and/or the feedback type information. Therefore, HARQ feedback load may be reduced without impacting HARQ performances.

14 Claims, 11 Drawing Sheets

(51) Int. Cl.
*H04L 1/1812* (2023.01)
*H04L 5/00* (2006.01)
(52) U.S. Cl.
CPC .......... *H04L 1/1848* (2013.01); *H04L 1/1861* (2013.01); *H04L 5/0055* (2013.01)
(58) Field of Classification Search
CPC ... H04L 1/1848; H04L 1/1825; H04L 1/1607; H04L 1/1812; H04W 4/70; H04W 72/0446
See application file for complete search history.

(56) References Cited

U.S. PATENT DOCUMENTS

| | | | |
|---|---|---|---|
| 2009/0022063 A1 | 1/2009 | Ju et al. | |
| 2009/0232070 A1* | 9/2009 | Muharemovic | H04L 1/1671 370/329 |
| 2009/0319850 A1* | 12/2009 | Baek | H04L 1/1874 714/E11.131 |
| 2011/0243048 A1* | 10/2011 | Wang | H04L 1/1874 370/329 |
| 2013/0028242 A1* | 1/2013 | Baker | H04W 72/0446 370/336 |
| 2016/0099799 A1* | 4/2016 | Bashar | H04L 1/1893 370/280 |
| 2016/0338044 A1* | 11/2016 | Yang | H04W 72/0406 |
| 2017/0078058 A1* | 3/2017 | Marinier | H04W 72/042 |
| 2017/0171883 A1* | 6/2017 | Noh | H04W 16/14 |
| 2018/0049064 A1* | 2/2018 | Li | H04W 24/02 |
| 2018/0139770 A1* | 5/2018 | Ozturk | H04W 28/0278 |
| 2018/0145795 A1* | 5/2018 | Yi | H04L 1/1887 |
| 2018/0220345 A1* | 8/2018 | Moon | H04W 36/0072 |
| 2018/0270854 A1* | 9/2018 | Lee | H04W 72/0446 |
| 2018/0279262 A1* | 9/2018 | Babaei | H04W 72/14 |
| 2019/0020381 A1* | 1/2019 | Tooher | H04W 88/04 |
| 2019/0081832 A1* | 3/2019 | Marinier | H04L 5/0007 |
| 2019/0116582 A1* | 4/2019 | Pelletier | H04W 72/048 |
| 2019/0123881 A1* | 4/2019 | Lee | H04L 5/0057 |
| 2019/0132104 A1* | 5/2019 | Lee | H04L 1/1607 |
| 2019/0150176 A1* | 5/2019 | Pelletier | H04W 72/1247 370/329 |
| 2019/0357178 A1* | 11/2019 | Bae | H04L 5/10 |
| 2019/0363860 A1* | 11/2019 | Kim | H04W 4/40 |
| 2019/0386785 A1* | 12/2019 | Zhou | H04W 4/70 |
| 2020/0059935 A1* | 2/2020 | Qian | H04W 74/02 |
| 2020/0413380 A1* | 12/2020 | Shimezawa | H04W 72/04 |

FOREIGN PATENT DOCUMENTS

| | | |
|---|---|---|
| CN | 102577208 A | 7/2012 |
| WO | 2010115295 A1 | 10/2010 |
| WO | 2017054876 A1 | 4/2017 |

OTHER PUBLICATIONS

PCT Notification of Transmittal of The International Search Report and The Written Opinion of The Internatnoial Searching Authority, or The Declaration for International application No. PCT/CN2018/085785—dated Jul. 27, 2018.
3GPP TSG RAN WG1 Meeting #88bis; Spokane, WA, USA; Source: Sony; Title: Intermediate feedbacks for improving URLLC latency and reliability (R1-1705213)—Apr. 3-7, 2017.
3GPP TSG-RAN WG1 #88; Athens, Greece; Source: Ericsson; Title: On High reliability (R1-1701872)—Feb. 13-17, 2017.
3GPP TSG RAN WG1 Meeting #88bis; Spokane, Washington, USA; Source: InterDigital Communications; Title Resource allocation for DL HARQ Feedback (R1-1705440)—Apr. 3-7, 2017.
Partial Supplemental European Search Report issued for Application No./Patent No. 18794833.6-1205/3619857 PCT/CN2018085785—dated Jan. 14, 2021.
Extended European Search Report issued for Application No./Patent No. 18794833.6-1205 / 3619857 PCT/CN2018085785—dated Apr. 20, 2021.
Chinese Office Action with English Machine Translation dated Feb. 8, 2022 for Patent Application No. 201880029638.4, consisting of 22-pages.

* cited by examiner

METHOD AND DEVICE FOR TRANSMITTING FEEDBACK INFORMATION

PRIORITY

This nonprovisional application is a U.S. National Stage Filing Under 35 U.S.C. § 371 of International Patent Application Serial No. PCT/CN2018/085785 filed May 7, 2018 and entitled "METHOD AND DEVICE FOR. TRANSMITTING FEEDBACK INFORMATION" which claims priority to International Patent Application Serial No. PCT/CN2017/083259 filed May 5, 2017 both of which are hereby incorporated by reference in their entirety.

TECHNICAL FIELD

Embodiments of the present disclosure generally relate to the field of communications, and more particularly, to a method and device for transmitting feedback information.

BACKGROUND

This section introduces aspects that may facilitate better understanding of the present disclosure. Accordingly, the statements of this section are to be read in this light and are not to be understood as admissions about what is in the prior art or what is not in the prior art.

For the fifth generation (5G) communications, it is supposed to support multiple types of services using a common radio access network (RAN), such as enhanced mobile broadband (eMBB), massive machine type communication (mMTC) and ultra-reliable and low latency communication (URLLC). These services require different quality of service (QoS), such as delay, data rate and packet loss rate.

For example, URLLC requires low delay and/or high reliability, but usually it also has very low data rate and possible sparse data transmission; mMTC typically requires long battery lifetime but does not require low delay or high data rate, and is often combined with small infrequent packets; eMBB requires high data rate, while delay in eMBB may be strict but typically less strict than that in URLLC.

For URLLC traffic, radio link control (RLC) automation repeat request (ARQ) may not be applicable due to low delay requirement. To guarantee the QoS, low packet loss rate relies on low residual media access control (MAC) transmission error. Hybrid automation repeat request (HARQ) retransmission is important to ensure the low residual MAC transmission error. Under this condition, an extremely high reliable HARQ feedback may be needed. However, a transmission scheme for the extremely reliable HARQ feedback may generate much higher load than that of a normal reliable HARQ feedback.

On the other hand, most packets of URLLC usually may be transmitted in small packets. For instance, there are usually message report or control information of procedures for factory automation. In some scenarios, control channel may take a large ratio of whole system load compared to data traffic.

SUMMARY

It has been found that when the extremely high reliable HARQ feedback is applied for a service (such as URLLC traffic) with small packet size, the load generated by the HARQ feedback may take a considerable ratio of general system load. It is expected to reduce HARQ feedback load without impacting HARQ performances.

In order to solve at least part of the above problems, methods, apparatus, devices and computer programs are provided in the present disclosure. It may be appreciated that embodiments of the present disclosure are not limited to a wireless system operating in new radio (NR) network, but could be more widely applied to any application scenario where similar problems exist.

Various embodiments of the present disclosure mainly aim at providing methods, devices and computer programs for controlling a transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for transmitting feedback information. A reliability grade of a feedback transmission is determined or it is determined that the feedback transmission is exempted at a certain situation, according to delay information and/or feedback type information.

In a first aspect, there is provided a method in a terminal device for transmitting feedback information; the method includes: determining feedback type information and/or delay information when data is transmitted by a network device; and determining a reliability grade of a feedback transmission or that the feedback transmission is exempted at a certain situation, according to the delay information and/or the feedback type information.

In one embodiment, the delay information is determined by a service type and/or a channel type of the data; and the delay information is different for different services and/or logic channels of the data.

In one embodiment, the method further includes: initiating a first timer according to a transmission timing of the data; a value of the first timer is determined by the delay information.

In one embodiment, it is determined that a hybrid automation repeat request (HARQ) feedback is exempted when the first timer expires; or it is determined that the HARQ feedback is to be transmitted with a first reliability grade when the first timer expires.

In one embodiment, it is determined that the HARQ feedback is to be transmitted with a second reliability grade which is higher than the first reliability grade when the first timer does not expire.

In one embodiment, the feedback type information may include hybrid automation repeat request (HARQ) acknowledge (ACK) and/or HARQ non-acknowledge (NACK).

In one embodiment, it is determined that an HARQ feedback is to be transmitted with a second reliability grade which is higher than a first reliability grade when the feedback type information is HARQ NACK; and/or it is determined that the HARQ feedback is to be transmitted with the first reliability grade when the feedback type information is not HARQ NACK.

In one embodiment, first resources for the HARQ feedback with the first reliability grade are different from second resources for the HARQ feedback with the second reliability grade.

In one embodiment, the first resources are allocated in a first carrier and the second resources are allocated in a second carrier which is different from the first carrier.

In one embodiment, an HARQ NACK is carried in the second resources by using a contention based transmission.

In a second aspect, there is provided a method in a network device for receiving feedback information; the method includes: transmitting data to a terminal device; a reliability grade of a feedback transmission is determined by the terminal device or it is determined that the feedback transmission is exempted at a certain situation, according to delay information and/or feedback type information.

In one embodiment, the method further includes: receiving a hybrid automation repeat request (HARQ) feedback with a first reliability grade or an HARQ feedback with a second reliability grade which is higher than the first reliability grade.

In one embodiment, the delay information is determined by a service type and/or a channel type of the data; and the delay information is different for different services and/or logical channels of the data.

In one embodiment, the method further includes: initiating a second timer according to a transmission timing of the data; wherein a value of the second timer is determined by the delay information.

In one embodiment, the method further includes: determining that an HARQ feedback is exempted when the second timer expires.

In one embodiment, the feedback type information may include hybrid automation repeat request (HARQ) acknowledge (ACK) and/or HARQ non-acknowledge (NACK).

In one embodiment, first resources for the HARQ feedback with the first reliability grade are different from second resources for the HARQ feedback with the second reliability grade.

In one embodiment, the method further includes: decoding the HARQ feedback in the first resources; determining a retransmission is to be performed when an HARQ NACK is detected in the first resources; and decoding the HARQ feedback in the second resources when an HARQ NACK is not detected in the first resources.

In one embodiment, the method further includes: soft combining signals in the first resources and the second resources when an HARQ ACK is not detected in the first resources.

In a third aspect, there is provide a terminal device, including a processor and a memory, wherein the memory containing instructions executable by the processor whereby the terminal device is operative to perform a method for transmitting feedback information according to the first aspect.

In a fourth aspect, there is provide a network device, including a processor and a memory, wherein the memory containing instructions executable by the processor whereby the network device is operative to perform a method for receiving feedback information according to the second aspect.

According to various embodiments of the present disclosure, a reliability grade of a feedback transmission is determined or it is determined that the feedback transmission is exempted at a certain situation, according to delay information and/or feedback type information. Therefore, HARQ feedback load may be reduced without impacting HARQ performances.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
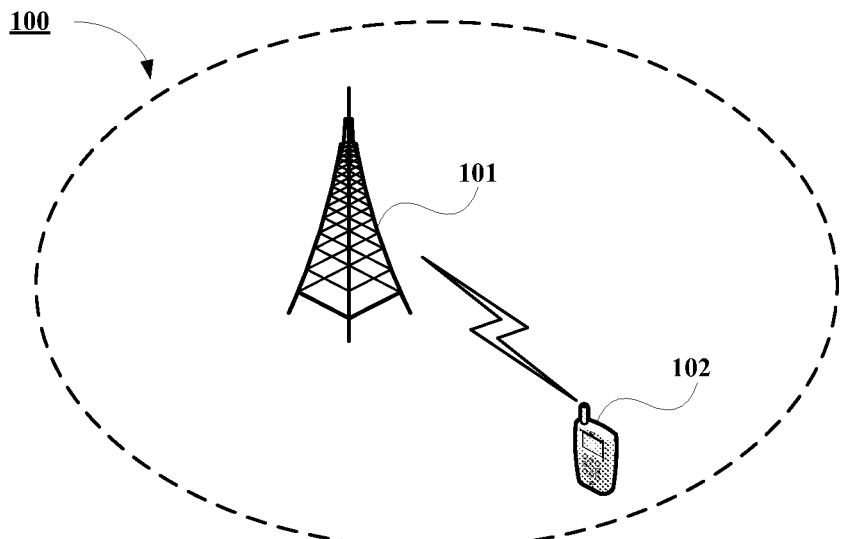
FIG. 1 is a schematic diagram which shows a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), LTE, and/or other suitable the first generation (1G), the second generation (2G), 2.5G, 2.75G, the third generation (3G), the fourth generation (4G), 4.5G, the future fifth generation (5G) communication protocols, Wireless Local Area Network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" may refer to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" may refer to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably.

As one example, a terminal device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission may refer to a transmission from the network device to a terminal device, and an uplink, UL transmission may refer to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. Now some exemplary embodiments of the present disclosure will be described below with reference to the figures.

FIG. 1 is a schematic diagram which shows a wireless communication network 100 in which embodiments of the disclosure may be implemented. As shown in FIG. 1, the wireless communication network 100 may include one or more network devices, for example network devices 101.

It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102") within its coverage, where N is a natural number.

Although network device 101 illustrated in the example wireless communication network may represent a device that includes a particular combination of hardware components, other embodiments may comprise network nodes with different combinations of components. It is to be understood that a network device 101 may comprise any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

In some scenarios, an extremely high reliable HARQ feedback may be needed. For example, a solution of two uplink control channel design is proposed; in which, one is for a normal reliable HARQ feedback (also may be referred to as a feedback with a first reliability grade) and the other is for an extremely high reliable HARQ feedback (also may be referred to as a feedback with a second reliability grade).

For example, for the normal reliable HARQ feedback, it is similar to HARQ feedback transmission schemes in long term evolution (LTE). That is to say, for the normal reliable HARQ feedback, normal HARQ feedback encoding and transmission as in LTE may be applied.

For example, for the extremely high reliable HARQ feedback, there are different options which could be used separately or jointly; for instance, repetition in time-frequency domain, longer code sequence for HARQ ACK/NACK bit coding, application of cyclic redundancy check (CRC) or using longer CRC sequence for HARQ feedback, more transmission power boost for uplink control information (UCI) transmission etc. However, it is not limited thereto in this disclosure.

According to such design philosophy, the extremely high reliable HARQ feedback transmission scheme may generate much higher load than that of the normal reliable HARQ feedback. It is expected to reduce HARQ feedback load without impacting HARQ performances.

First Aspect of Embodiments

A method for transmitting feedback information is provided in an embodiment. The method is implemented at a terminal device as an example. Furthermore, an HARQ feedback and/or a URLLC service are/is illustrated as an example, however it is not limited in this disclosure. For example, other latency sensible communications may be applicable to this disclosure.

Figure 2:
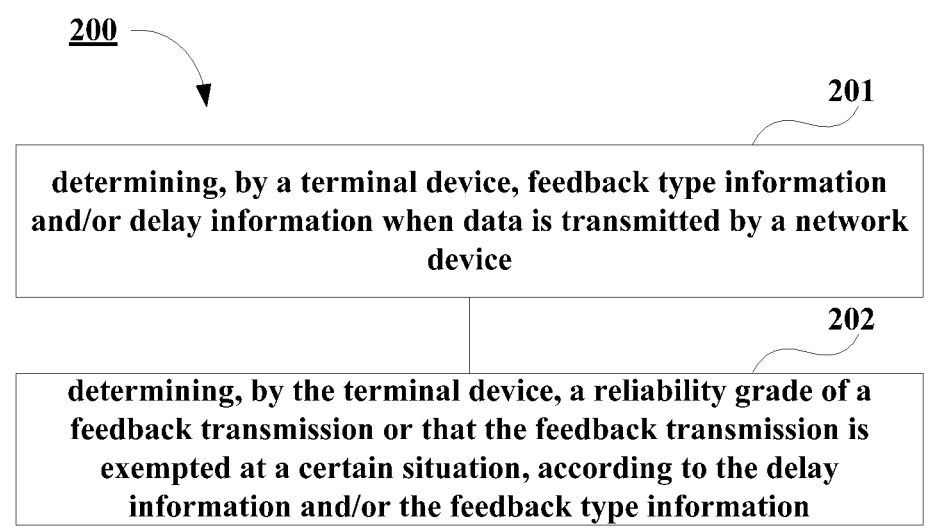
FIG. 2 is a diagram which shows a method 200 for transmitting feedback information in accordance with an embodiment of the present disclosure.

FIG. 2 is a diagram which shows a method 200 for transmitting feedback information in accordance with an embodiment of the present disclosure, and illustrates the method for transmitting feedback information by taking a terminal device as an example.

As shown in FIG. 2, the method 200 includes determining, by a terminal device, feedback type information and/or delay information when data is transmitted by a network device, at block 201.

As shown in FIG. 2, the method 200 further includes determining, by the terminal device, a reliability grade of a feedback transmission or that the feedback transmission is exempted at a certain situation, according to the delay information and/or the feedback type information, at block 202.

In an embodiment, the delay information may be determined by a service type and/or a channel type of the data; and the delay information is different for different services and/or logic channels of the data. The terminal device may learn the delay information in advance, for example via downlink control information (DCI) from the network device.

It should be appreciated that the delay information is only example of the disclosure, but it is not limited thereto. For example, other information may be adopted according to actual cases.

In an embodiment, for example, for different types of services, delay requirements may be different and allowed delay budgets on air interface may be different as well. When experienced delay in the air interface already exceeds certain delay limit, the HARQ feedback may not trigger HARQ retransmission anymore. Under this condition, using of the extremely high reliable HARQ feedback transmission may result in wasting a considerable resource.

In an embodiment, the feedback transmission may be exempted at a certain situation. That is to say, the HARQ feedback transmission may be skipped at a receiving node which received the data; at a transmitting node which transmitted the data, it is configured to not to expect any feedback at this case.

In an embodiment, the terminal device may initiate a first timer according to a transmission timing of the data; in which a value of the first timer is determined by the delay information.

Figure 3:
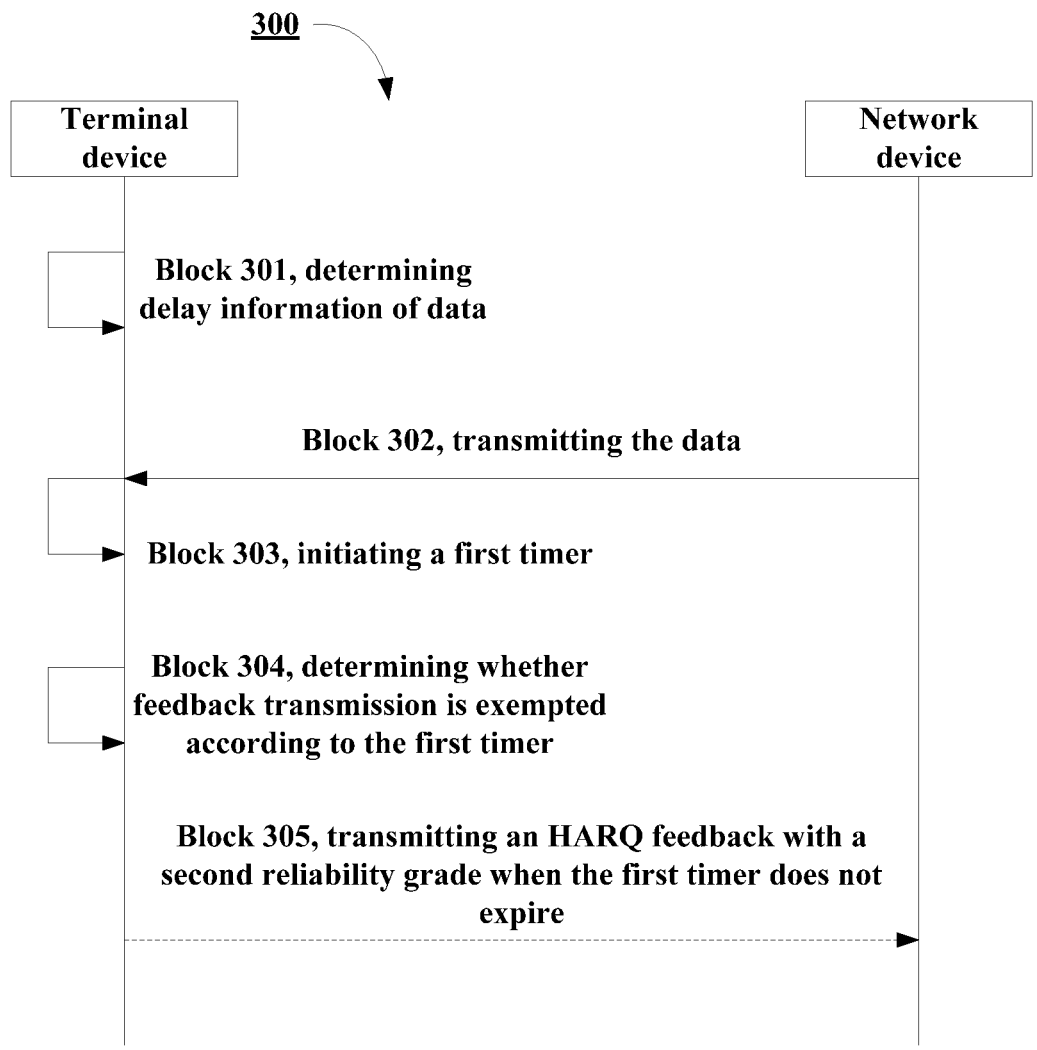
FIG. 3 is a diagram which shows a method 300 for transmitting feedback information in accordance with an embodiment of the present disclosure.

FIG. 3 is a diagram which shows a method 300 for transmitting feedback information in accordance with an embodiment of the present disclosure, and illustrates the method for transmitting feedback information by taking a terminal device and a network device as an example.

As shown in FIG. 3, the method 300 includes determining, by a terminal device, delay information of data, at block 301; and transmitting, by a network device, the data to the terminal device, at block 302; and initiating, by the terminal device, a first timer according to a transmission timing of the data, at block 303; a value of the first timer is determined by the delay information.

As shown in FIG. 3, the method 300 further includes determining, by the terminal device, whether the feedback transmission is exempted according to the first timer, at block 304.

In this embodiment, it is determined that a hybrid automation repeat request (HARQ) feedback is exempted when the first timer expires; and the HARQ feedback is to be transmitted with a second reliability grade which is higher than the first reliability grade when the first timer does not expire.

As shown in FIG. 3, the method 300 may further include transmitting, by the terminal device, an HARQ feedback with a second reliability grade when the first timer does not expire, at block 305.

For example, an extremely high reliable HARQ feedback may be transmitted when the first timer does not expire, an HARQ feedback is exempted when the first timer expires. Therefore, HARQ feedback load may be reduced without impacting HARQ performances.

Figure 4:
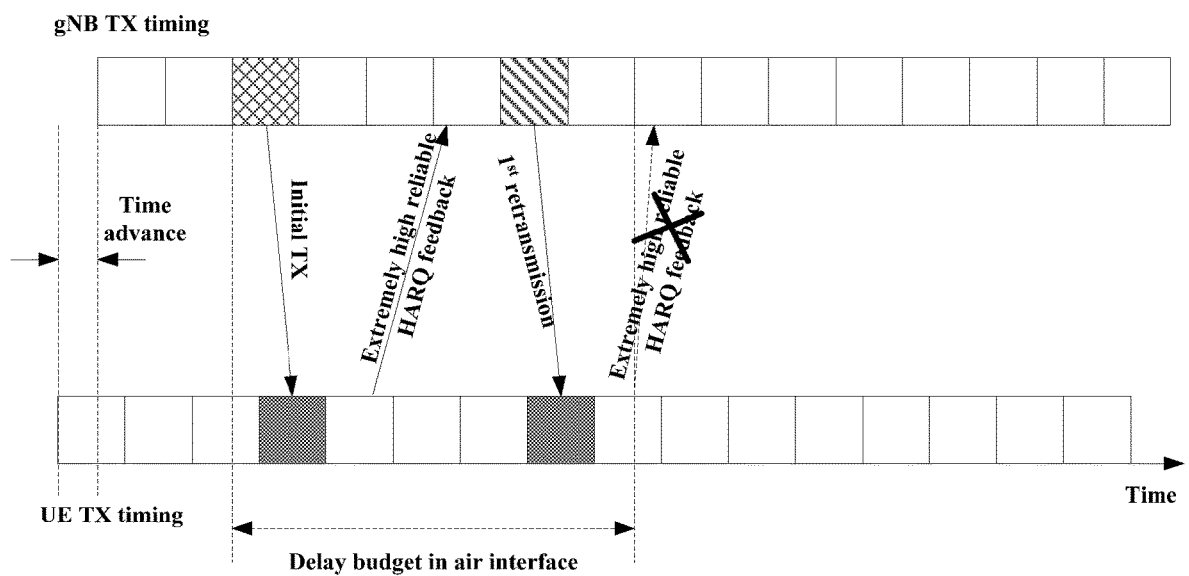
FIG. 4 is an example which shows an HARQ feedback is skipped in accordance with an embodiment of the present disclosure.

FIG. 4 is an example which shows an HARQ feedback is skipped in accordance with an embodiment of the present disclosure, and illustrates the method for transmitting feedback information by taking gNB and UE as an example.

For example, a first timer is configured in UE side and the UE starts it at each time according to a timing scheduled by a downlink control information (DCI). As shown in FIG. 4, "delay budget in air interface" may denote duration of the first timer. The network device and/or the terminal device may set the first timer according the delay budget determined according to the delay requirement of service.

As shown in FIG. 4, the UE may transmit the extremely high reliable HARQ feedback (with a second reliability grade) when the first timer does not expire. Furthermore, a HARQ feedback for last retransmission may be skipped when the UE perceives such a feedback will not be needed. That is to say, if the first timer expires, the UE does not transmit the HARQ feedback when the UE determines that there will be not retransmission for the data due to the delay budget.

In an embodiment, a reliability grade of a feedback transmission may be determined according to the delay information. For example, normal (or conventional) reliability grade of HARQ feedback transmission is used instead of extremely high reliability grade of transmission when the delay exceeds the preconfigured budget.

Figure 5:
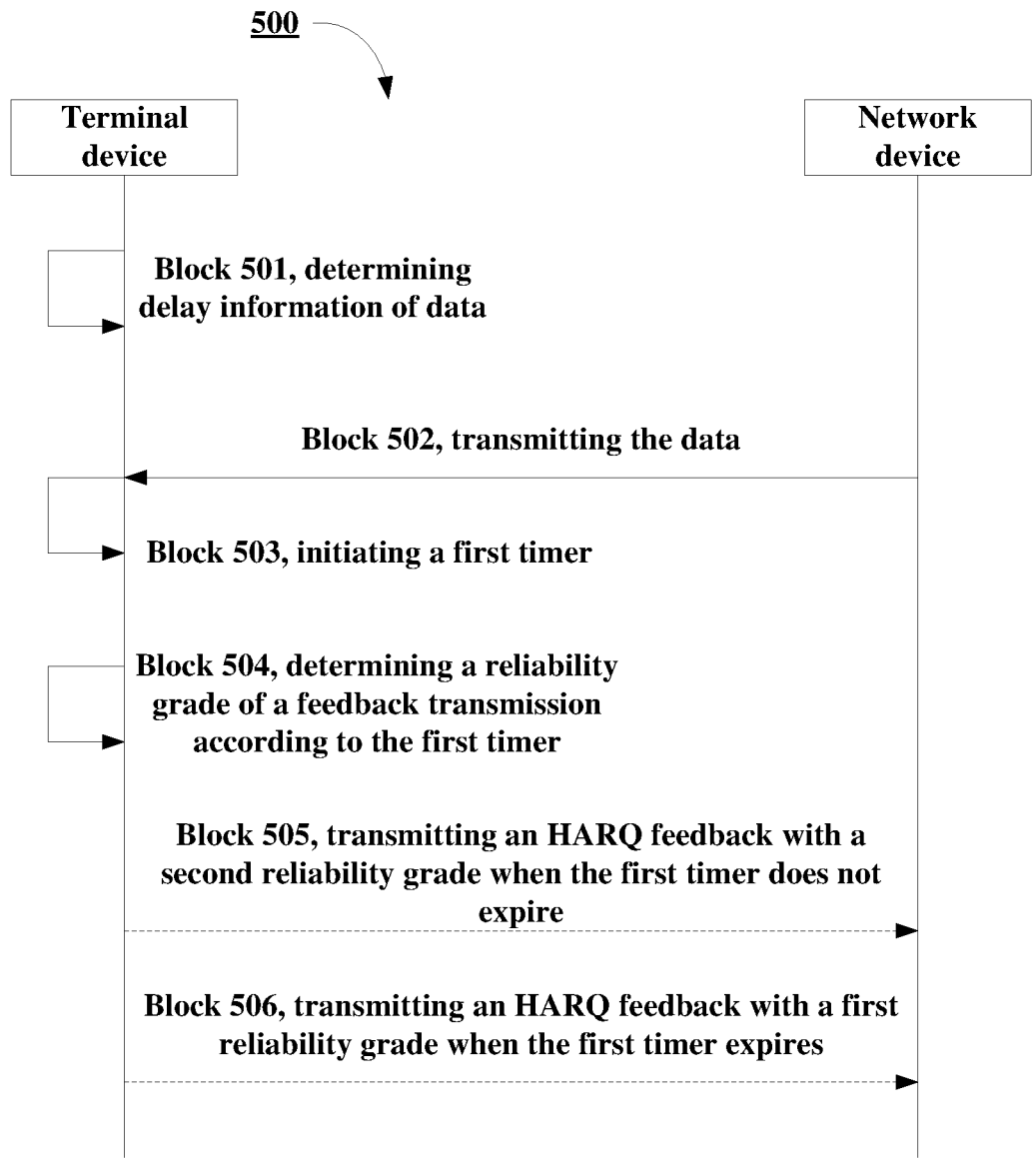
FIG. 5 is a diagram which shows a method 500 for transmitting feedback information in accordance with an embodiment of the present disclosure.

FIG. 5 is a diagram which shows a method 500 for transmitting feedback information in accordance with an embodiment of the present disclosure, and illustrates the method for transmitting feedback information by taking a terminal device and a network device as an example.

As shown in FIG. 5, the method 500 includes determining, by a terminal device, delay information of data, at block 501; and transmitting, by a network device, the data to the terminal device, at block 502; and initiating, by the terminal device, a first timer according to a transmission timing of the data, at block 503; a value of the first timer is determined by the delay information.

As shown in FIG. 5, the method 500 further includes determining, by the terminal device, a reliability grade of a feedback transmission according to the first timer, at block 504.

In this embodiment, it is determined that the HARQ feedback is to be transmitted with a first reliability grade when the first timer expires; and/or the HARQ feedback is to be transmitted with a second reliability grade which is higher than the first reliability grade when the first timer does not expire.

As shown in FIG. 5, the method 500 may further include transmitting, by the terminal device, an HARQ feedback with a second reliability grade when the first timer does not expire, at block 505.

As shown in FIG. 5, the method 500 may further include transmitting, by the terminal device, an HARQ feedback with a first reliability grade when the first timer expires, at block 506.

For example, an extremely high reliable HARQ feedback may be transmitted when the first timer does not expire, a normal reliable HARQ feedback may be transmitted when the first timer expires. Therefore, HARQ feedback load may be reduced without impacting HARQ performances.

Figure 6:
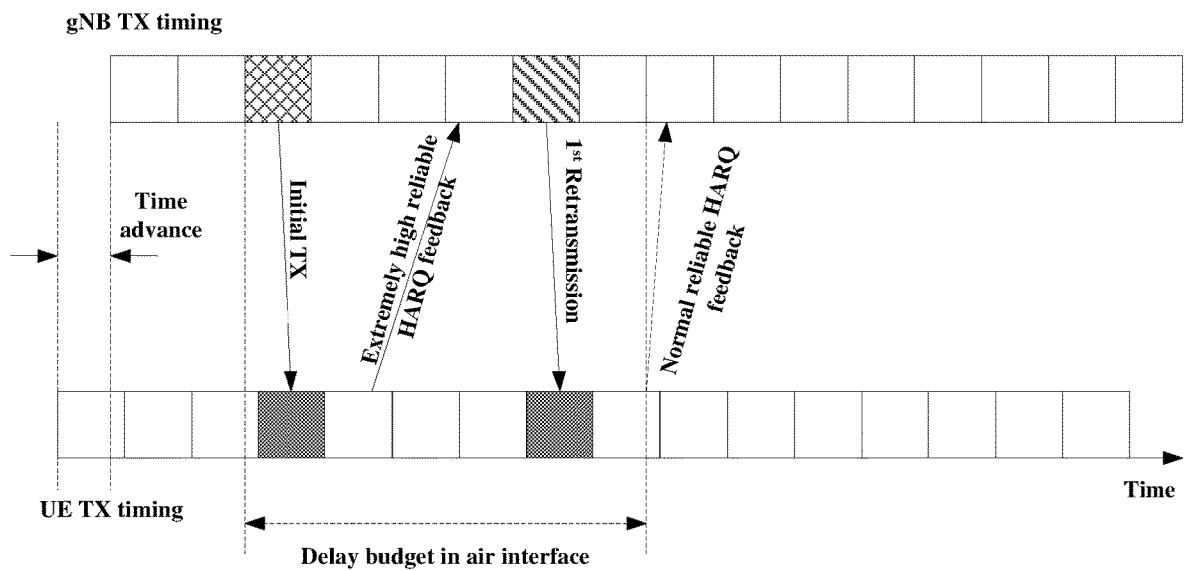
FIG. 6 is an example which shows a normal reliable HARQ feedback is transmitted in accordance with an embodiment of the present disclosure.

FIG. 6 is an example which shows a normal reliable HARQ feedback is transmitted in accordance with an embodiment of the present disclosure, and illustrates the method for transmitting feedback information by taking gNB and UE as an example.

For example, a first timer is configured in UE side and the UE starts it at each time according to a timing scheduled by a downlink control information (DCI). As shown in FIG. 6, "delay budget in air interface" may denote duration of the first timer. The network device and/or the terminal device may set the first timer according the delay budget determined according to the delay requirement of service.

As shown in FIG. 6, the UE may transmit the normal reliable HARQ feedback (with a first reliability grade) when the timer expires. Furthermore, the UE may transmit the extremely high reliable HARQ feedback (with a second reliability grade) when the timer does not expire. That is to say, if the first timer expires, the UE may transmit a conventional reliability grade of HARQ feedback instead of an extremely high reliability grade of HARQ feedback.

It should be appreciated that the FIGS. 3-6 are only examples of the disclosure, but it is not limited thereto. For example, the order of operations at blocks may be adjusted and/or some blocks may be omitted. Moreover, some blocks not shown in the FIGS. 3-6 may be added.

In an embodiment, a reliability grade of a feedback transmission may be determined according to feedback type information. The feedback type information may include HARQ acknowledge (ACK) and/or HARQ non-acknowledge (NACK); but it is not limited in this disclosure.

In this embodiment, it may be determined that an HARQ feedback is to be transmitted with a second reliability grade which is higher than a first reliability grade when the feedback type information is HARQ NACK; and/or the HARQ feedback is to be transmitted with the first reliability grade when the feedback type information is not HARQ NACK.

For example, the extremely high reliable HARQ feedback may be used only for HARQ NACK because the HARQ retransmission is triggered by HARQ NACK. The extremely high reliable transmission for HARQ ACK is not necessary since it does not trigger the HARQ retransmission. In a small probability, the ACK may be mistakenly decoded to be a NACK, a ReTX is done but it could be managed not to impair the HARQ performance.

From another aspect, HARQ ACK occurrence probability is much higher than that of the HARQ NACK occurrence especially for URLLC service. When the extremely high reliable transmission scheme is only applied for HARQ NACK transmission and only normal reliable transmission scheme is applied for HARQ ACK, considerable overhead may be reduced without increase of the residual MAC transmission error since the HARQ NACK reliability is guaranteed.

Figure 7:
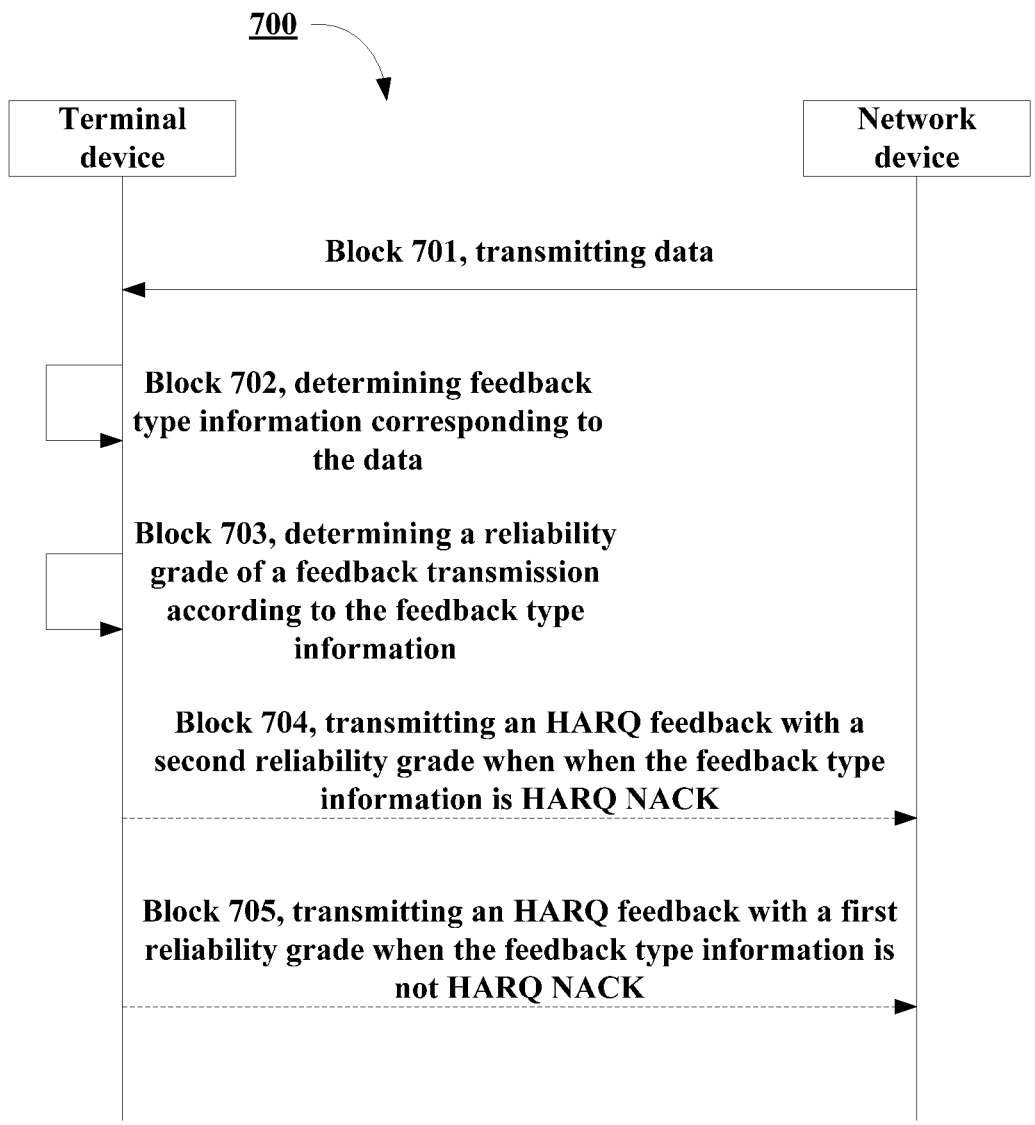
FIG. 7 is a diagram which shows a method 700 for transmitting feedback information in accordance with an embodiment of the present disclosure.

FIG. 7 is a diagram which shows a method 700 for transmitting feedback information in accordance with an embodiment of the present disclosure, and illustrates the method for transmitting feedback information by taking a terminal device and a network device as an example.

As shown in FIG. 7, the method 700 includes transmitting, by a network device, data to a terminal device, at block 701; and determining, by the terminal device, feedback type information corresponding to the data, at block 702.

In this embodiment, the feedback type information may include HARQ ACK or HARQ NACK; but it is not limited in this disclosure. For example, the feedback type information may include other information (neither NACK nor ACK), such as it may be referred to as DTX.

As shown in FIG. 7, the method 700 further includes determining, by the terminal device, a reliability grade of a feedback transmission according to the feedback type information, at block 703.

In this embodiment, it is determined that an HARQ feedback is to be transmitted with a second reliability grade which is higher than a first reliability grade when the feedback type information is HARQ NACK; and the HARQ feedback is to be transmitted with the first reliability grade when the feedback type information is not HARQ NACK.

As shown in FIG. 7, the method 700 may further include transmitting, by the terminal device, an HARQ feedback with a second reliability grade when the feedback type information is HARQ NACK, at block 704.

As shown in FIG. 7, the method 700 may further include transmitting, by the terminal device, an HARQ feedback with a first reliability grade when the feedback type information is not HARQ NACK, at block 705.

For example, an extremely high reliable HARQ feedback may be transmitted when there is HARQ NACK, a normal reliable HARQ feedback may be transmitted when there is not HARQ NACK. Therefore, HARQ feedback load may be reduced without impacting HARQ performances.

It should be appreciated that FIG. 7 is only an example of the disclosure, but it is not limited thereto. For example, the order of operations at blocks may be adjusted and/or some blocks may be omitted. Moreover, some blocks not shown in FIG. 7 may be added. As another example, feedback transmission may be exempted when the feedback type information is HARQ ACK.

In an embodiment, first resources for the HARQ feedback with the first reliability grade may be different from second resources for the HARQ feedback with the second reliability grade.

Figure 8:
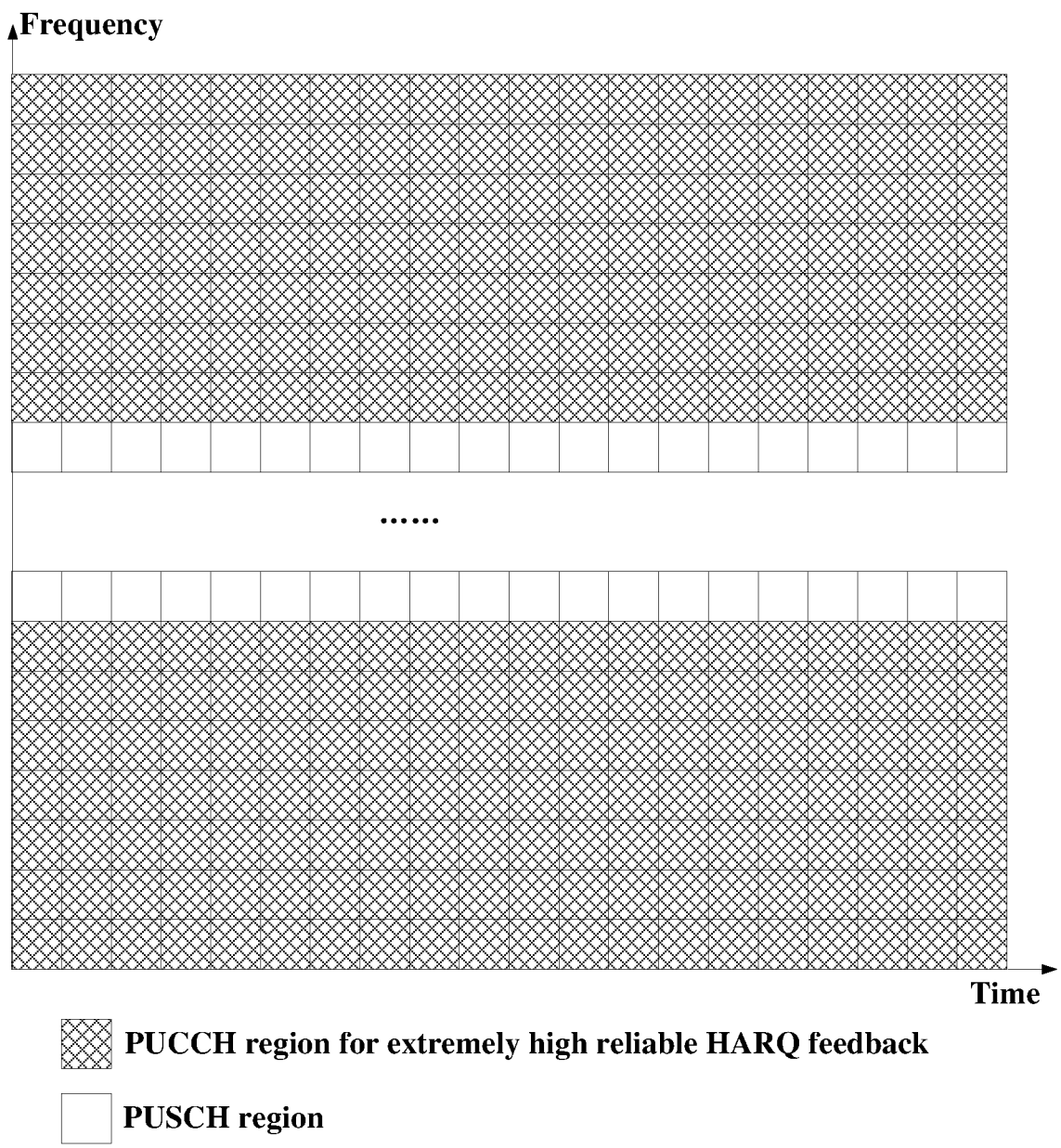
FIG. 8 is an example which shows time-frequency resources for the extremely high reliable HARQ feedback in accordance with an embodiment of the present disclosure.
Figure 9:
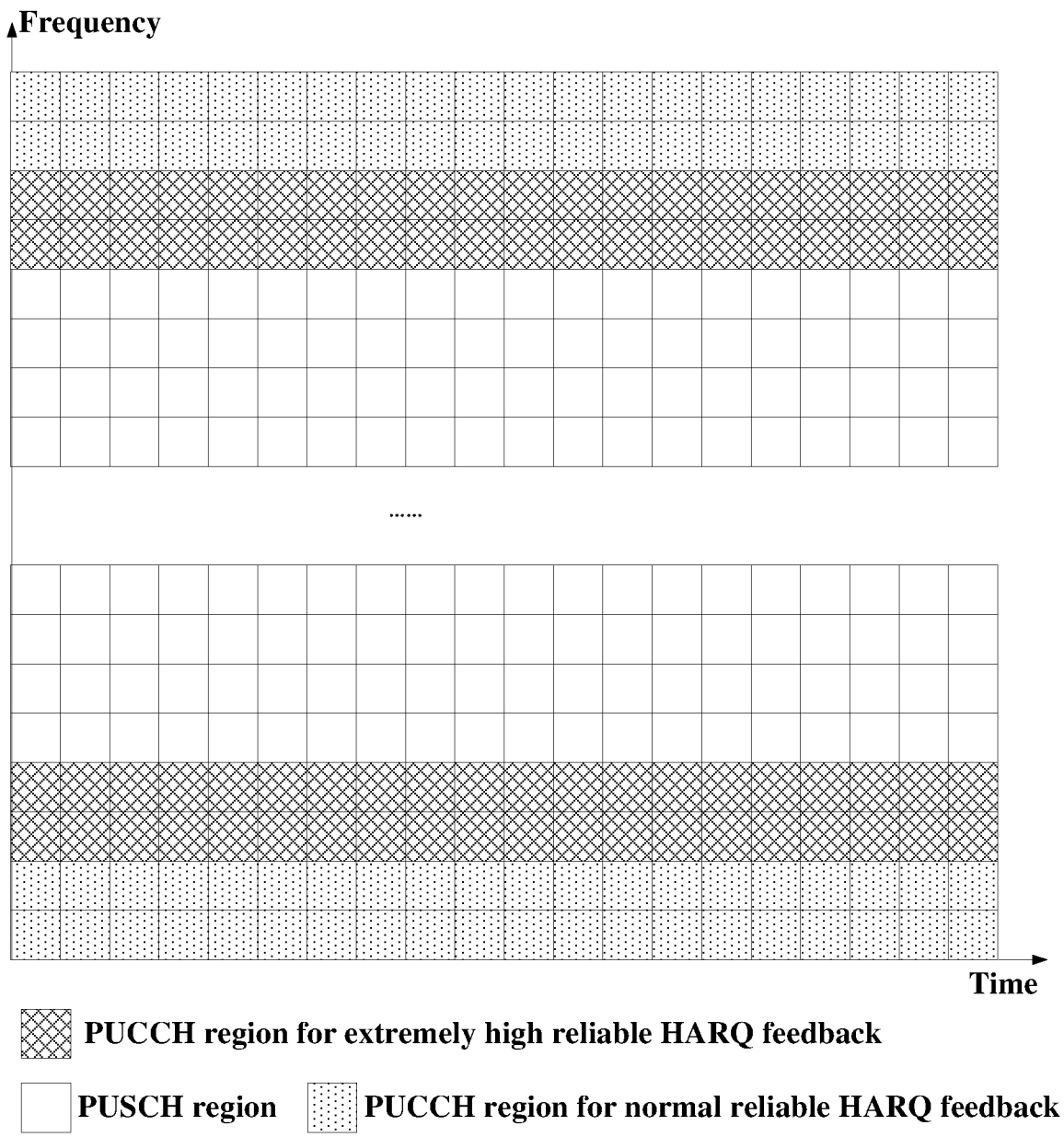
FIG. 9 is an example which shows first resources and second resources in accordance with an embodiment of the present disclosure.

FIG. 8 is an example which shows time-frequency resources for the extremely high reliable HARQ feedback in accordance with an embodiment of the present disclosure. FIG. 9 is an example which shows first resources and second resources in accordance with an embodiment of the present disclosure.

For example, the extremely high reliable HARQ feedback is only applied using the resource in a physical uplink control channel (PUCCH) resource pool (e.g. second resources denoted by ▦) for HARQ NACK and a higher reliability grade is applied. A HARQ ACK is only transmitted using the normal reliable HARQ feedback transmission schemes using the resource in another resource pool (e.g. first resources denoted by ▨). As shown in FIG. 8 and FIG. 9, there still may be some resources for physical uplink shared channel (PUSCH) denoted by ☐.

As another example, it can be configured that HARQ NACK may be transmitted duplicated in both of the PUCCH resource pools. For the HARQ NACK in the first resources, the normal reliable HARQ feedback transmission scheme is applied. As a duplicated signal, the HARQ NACK is also transmitted in the second resources, and a higher reliability grade of transmission is applied.

In an embodiment, the first resources may be allocated in a first carrier and the second resources may be allocated in a second carrier which is different from the first carrier.

For example, two resource pools for HARQ feedback may be allocated in different carriers in case of carrier aggregation (CA). The first resources may be in a first carrier and the second resources may be in another carrier (different from the first carrier). Therefore, frequency diversity may be maximized for HARQ transmission.

In an embodiment, an HARQ NACK may be carried in the second resources by using a contention based transmission. That is to say, the HARQ NACK in second resources may use contention based transmission to avoid large size resource pool allocation for low probability HARQ NACK transmissions.

For example, orthogonal cover code (OCC) and/or different demodulation reference signal (DMRS) cycle prefix (CP) may be further used to differentiate the HARQ feedback from different users at collision.

It should be appreciated that only operations related to this disclosure are illustrated in some embodiments. For the sake of simplicity, detail description of other operations, such as encoding, symbol modulating, resource mapping, are not illustrated in this disclosure.

Furthermore, two reliability grade, such as the first reliability grade (e.g., the normal reliable HARQ feedback) and the second reliability grade (e.g., the extremely high reliable HARQ feedback), are illustrated as examples of this disclosure, but it is not limited thereto. For example, two or more reliability grade may be adopted according to actual scenarios.

As can be seen from the above embodiments, a reliability grade of a feedback transmission is determined or it is determined that the feedback transmission is exempted at a certain situation, according to delay information and/or feedback type information. Therefore, HARQ feedback load may be reduced without impacting HARQ performances.

Second Aspect of Embodiments

A method for receiving feedback information is provided in an embodiment. The method is implemented at a network device as an example, and the same contents as those in the first aspect of embodiments are omitted.

Figure 10:
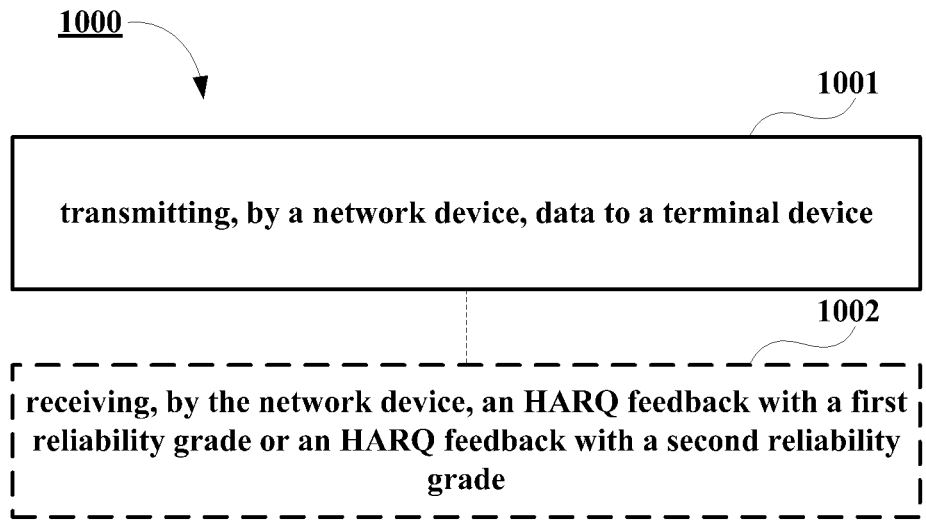
FIG. 10 is a diagram which shows a method 1000 for receiving feedback information in accordance with an embodiment of the present disclosure.

FIG. 10 is a diagram which shows a method 1000 for receiving feedback information in accordance with an embodiment of the present disclosure, and illustrates the method for receiving feedback information by taking a network device as an example.

As shown in FIG. 10, the method 1000 includes transmitting, by a network device, data to a terminal device, at block 1001. A reliability grade of a feedback transmission is determined by the terminal device or it is determined that the feedback transmission is exempted at a certain situation, according to delay information and/or feedback type information.

In an embodiment, as shown in FIG. 10, the method 1000 may further include receiving, by the network device, an HARQ feedback with a first reliability grade or an HARQ feedback with a second reliability grade which is higher than the first reliability grade. In another embodiment, the feedback transmission may be exempted at a certain situation.

In an embodiment, the delay information may be determined by a service type and/or a channel type of the data;

and the delay information may be different for different services and/or logical channels of the data.

In an embodiment, the network device may initiate a second timer according to a transmission timing of the data. A value of the second timer is determined by the delay information. Furthermore, the network device may determine that an HARQ feedback is exempted when the second timer expires.

In an embodiment, the feedback type information may include HARQ ACK and/or HARQ NACK; but it is not limited in this disclosure.

In an embodiment, first resources for the HARQ feedback with the first reliability grade may be different from second resources for the HARQ feedback with the second reliability grade.

Figure 11:
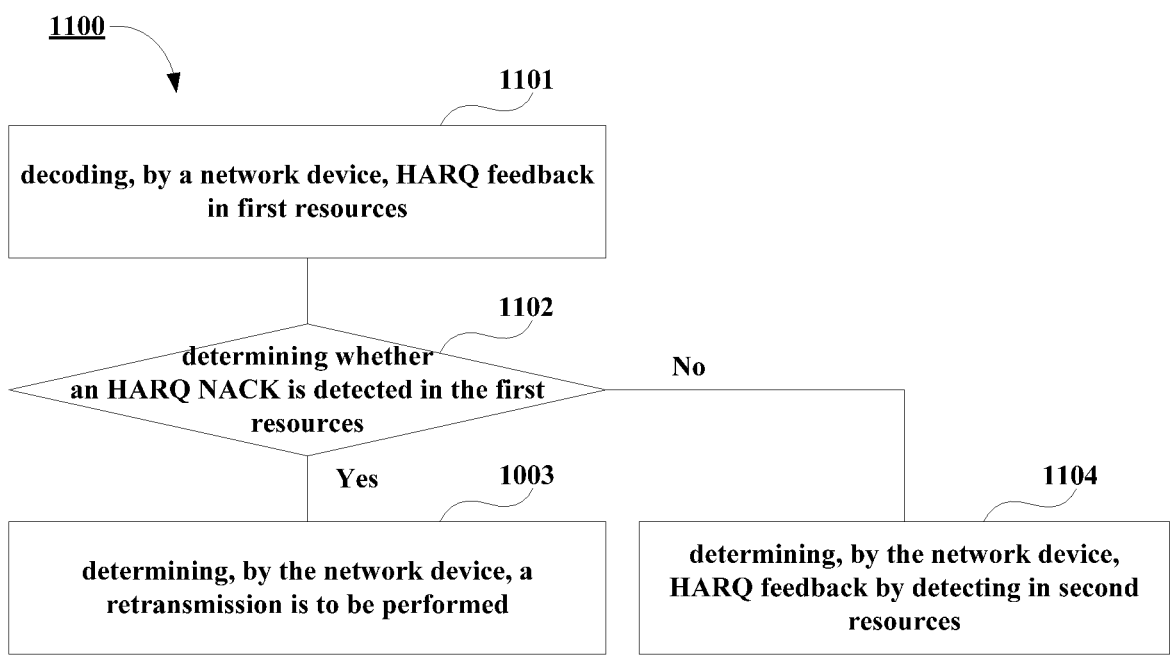
FIG. 11 is a diagram which shows a decoding procedure 1100 in accordance with an embodiment of the present disclosure.

FIG. 11 is a diagram which shows a decoding procedure 1100 in accordance with an embodiment of the present disclosure, and illustrates the procedure by taking a network device as an example.

As shown in FIG. 11, the procedure 1100 includes decoding, by a network device, HARQ feedback in first resources, at block 1101; and determining, by the network device, whether an HARQ NACK is detected in the first resources, at block 1102.

As shown in FIG. 11, the procedure 1100 may further include determining, by the network device, a retransmission is to be performed when an HARQ NACK is detected in the first resources, at block 1103; and determining, by the network device, the HARQ feedback by detecting in the second resources when an HARQ NACK is not detected in the first resources, at block 1104.

For example, the network device (such as gNB) may first decode the HARQ feedback in the resource pool of the first resources. If HARQ NACK is detected, the network device may determine a retransmission based on the decoding results. If HARQ ACK or DTX is detected, the network device may further determine if there is HARQ NACK received in the resource pool of the second resources.

As another example, if HARQ ACK is detected in resource pool of the first resources and no HARQ NACK is determined in resource pool of the second resources, the network device may determine that the data is correctly received by the terminal device (such as UE). If DTX is detected in both of the pools, the network device may determine that the data is not correctly received by the terminal device.

In an embodiment, signals in the first resources and the second resources may be soft combined when an HARQ ACK is not detected in the first resources.

For example, when HARQ ACK is not detected in resource pool of the second resources, the network device may tentatively apply soft combining of the received signals in two pools for HARQ feedback decoding for data transmission to enhance the decoding quality.

It should be appreciated that only operations related to this disclosure are illustrated in some embodiments. For the sake of simplicity, detail description of other operations, such as decoding, symbol demodulating, resource mapping, are not illustrated in this disclosure.

As can be seen from the above embodiments, a reliability grade of a feedback transmission is determined or it is determined that the feedback transmission is exempted at a certain situation, according to delay information and/or feedback type information. Therefore, HARQ feedback load may be reduced without impacting HARQ performances.

Third Aspect of Embodiments

An apparatus for transmitting feedback information is provided in an embodiment. The apparatus may be configured in the terminal device 102, and the same contents as those in the first aspect of embodiments are omitted.

Figure 12:
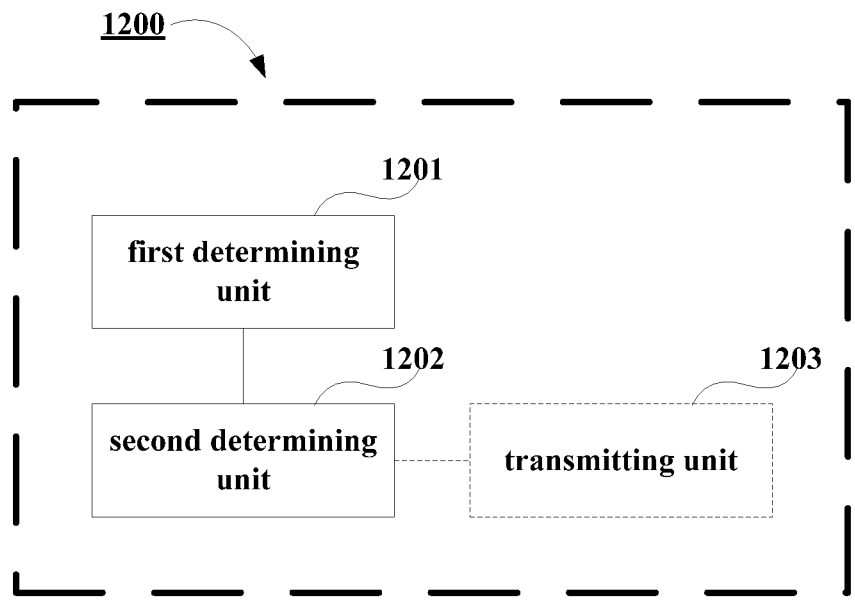
FIG. 12 is a block diagram which shows an apparatus 1200 for transmitting feedback information in accordance with an embodiment of the present disclosure.

FIG. 12 is a block diagram which shows an apparatus 1200 for transmitting feedback information in accordance with an embodiment of the present disclosure.

As shown in FIG. 12, the apparatus 1200 includes: a first determining unit 1201 configured to determine feedback type information and/or delay information when data is transmitted by a network device; and a second determining unit 1202 configured to determine a reliability grade of a feedback transmission or that the feedback transmission is exempted at a certain situation, according to the delay information and/or the feedback type information.

In an embodiment, the delay information may be determined by a service type and/or a channel type of the data; and the delay information may be different for different services and/or logic channels of the data.

In an embodiment, a first timer may be initiated according to a transmission timing of the data; wherein a value of the first timer is determined by the delay information. It is determined that a hybrid automation repeat request (HARQ) feedback is exempted when the first timer expires; or it is determined that the HARQ feedback is to be transmitted with a first reliability grade when the first timer expires. Furthermore, it is determined that the HARQ feedback is to be transmitted with a second reliability grade which is higher than the first reliability grade when the first timer does not expire.

As shown in FIG. 12, the apparatus 1200 may further include: a transmitting unit 1203 configured to transmit an HARQ feedback with a first reliability grade or an HARQ feedback with a second reliability grade which is higher than the first reliability grade.

In an embodiment, the feedback type information may include HARQ ACK and/or HARQ NACK. It is determined that an HARQ feedback is to be transmitted with a second reliability grade which is higher than a first reliability grade when the feedback type information is HARQ NACK; and/or it is determined that the HARQ feedback is to be transmitted with the first reliability grade when the feedback type information is not HARQ NACK.

In an embodiment, first resources for the HARQ feedback with the first reliability grade are different from second resources for the HARQ feedback with the second reliability grade.

For example, the first resources are allocated in a first carrier and the second resources are allocated in a second carrier which is different from the first carrier.

In an embodiment, an HARQ NACK is carried in the second resources by using a contention based transmission.

It should be appreciated that components included in the apparatus 1200 correspond to the operations of the method 200. Therefore, all operations and features described above with reference to FIG. 2 are likewise applicable to the components included in the apparatus 1200 and have similar effects. For the purpose of simplification, the details will be omitted.

It should be appreciated that the components included in the apparatus 1200 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1200 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1200 may be a part of a device. But it is not limited thereto, for example, the apparatus 1200 may be the terminal device 102, other parts of the terminal device 102, such as transmitter and receiver, are omitted in the FIG. 12.

As can be seen from the above embodiments, a reliability grade of a feedback transmission is determined or it is determined that the feedback transmission is exempted at a certain situation, according to delay information and/or feedback type information. Therefore, HARQ feedback load may be reduced without impacting HARQ performances.

Fourth Aspect of Embodiments

An apparatus for receiving feedback information is provided in an embodiment. The apparatus may be configured in the network device 101, and the same contents as those in the first or second aspect of embodiments are omitted.

Figure 13:
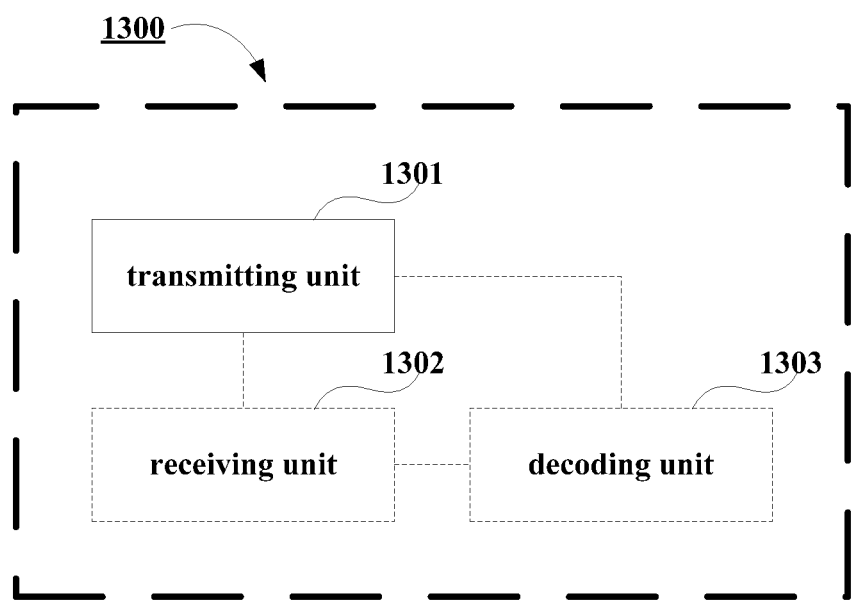
FIG. 13 is a block diagram which shows an apparatus 1300 for receiving feedback information in accordance with an embodiment of the present disclosure.

FIG. 13 is a block diagram which shows an apparatus 1300 for receiving feedback information in accordance with an embodiment of the present disclosure.

As shown in FIG. 13, the apparatus 1300 includes: a transmitting unit 1301 configured to transmit data to a terminal device; a reliability grade of a feedback transmission is determined by the terminal device or it is determined that the feedback transmission is exempted at a certain situation, according to delay information and/or feedback type information.

As shown in FIG. 13, the apparatus 1300 may further include: a receiving unit 1302 configured to receive an HARQ feedback with a first reliability grade or an HARQ feedback with a second reliability grade which is higher than the first reliability grade.

In an embodiment, the delay information may be determined by a service type and/or a channel type of the data; and the delay information may be different for different services and/or logical channels of the data.

In an embodiment, a second timer may be initiated according to a transmission timing of the data; a value of the second timer is determined by the delay information. It is determined that an HARQ feedback is exempted when the second timer expires.

In an embodiment, the feedback type information may include HARQ ACK and/or HARQ NACK.

In an embodiment, first resources for the HARQ feedback with the first reliability grade are different from second resources for the HARQ feedback with the second reliability grade.

As shown in FIG. 13, the apparatus 1300 may further include: a decoding unit 1303 configured to decode the HARQ feedback in the first resources; determine a retransmission is to be performed when an HARQ NACK is detected in the first resources; and decode the HARQ feedback in the second resources when an HARQ NACK is not detected in the first resources.

In an embodiment, the decoding unit 1303 may be further configured to soft combine signals in the first resources and the second resources when an HARQ ACK is not detected in the first resources.

It should be appreciated that components included in the apparatus 1300 correspond to the operations of the method 1000. Therefore, all operations and features described above with reference to FIG. 10 are likewise applicable to the components included in the apparatus 1300 and have similar effects. For the purpose of simplification, the details will be omitted.

It should be appreciated that the components included in the apparatus 1300 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1300 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1300 may be a part of a device. But it is not limited thereto, for example, the apparatus 1300 may be the network device 101, other parts of the network device 101, such as transmitter and receiver, are omitted in the FIG. 13.

As can be seen from the above embodiments, a reliability grade of a feedback transmission is determined or it is determined that the feedback transmission is exempted at a certain situation, according to delay information and/or feedback type information. Therefore, HARQ feedback load may be reduced without impacting HARQ performances.

Fifth Aspect of Embodiments

A communications system is provided, as shown in FIG. 1, the communication system 100 includes a network device 101 configured to perform a method for receiving feedback information according to the second aspect of embodiments and a terminal device 102 configured to perform a method for transmitting feedback information according to the first aspect of embodiments.

A device (such as a network device 101 or a terminal device 102) is provided in an embodiment, and the same contents as those in the first aspect and the second aspect of embodiments are omitted.

Figure 14:
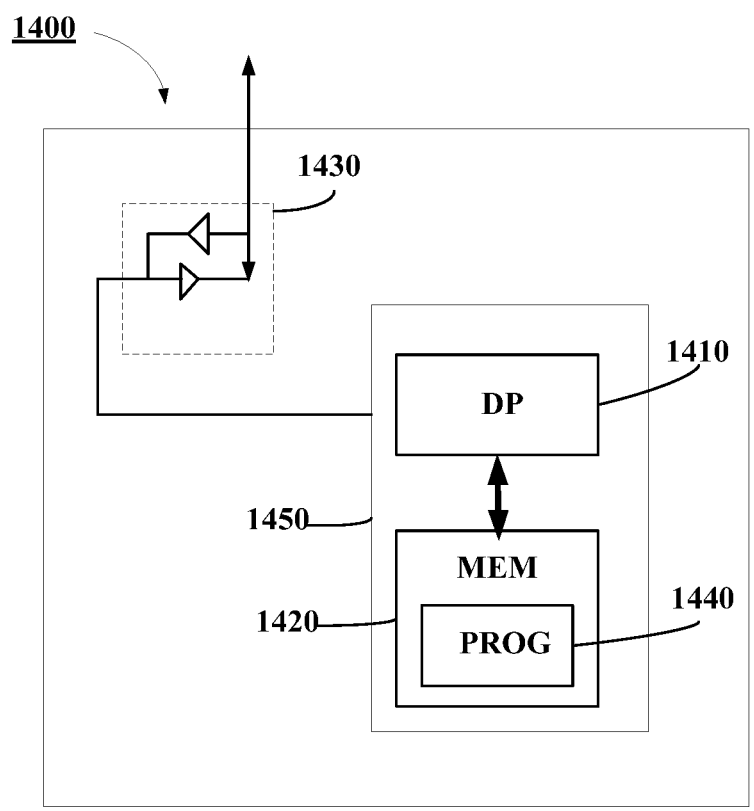
FIG. 14 is a simplified block diagram which shows a device 1400 that is suitable for implementing embodiments of the present disclosure.

FIG. 14 is a simplified block diagram which shows a device 1400 that is suitable for implementing embodiments of the present disclosure. It would be appreciated that the device 1400 may be implemented as at least a part of, for example, the network device 101 or the terminal device 102.

As shown in FIG. 14, the device 1400 includes a communicating means 1430 and a processing means 1450. The processing means 1450 includes a data processor (DP) 1410, a memory (MEM) 1420 coupled to the DP 1410. The communicating means 1430 is coupled to the DP 1410 in the processing means 1450. The MEM 1420 stores a program (PROG) 1440. The communicating means 1430 is used for communications with other devices, which may be implemented as a transceiver for transmitting/receiving signals.

In some other embodiments where the device 1400 acts as a terminal device. For example, the memory 1420 stores a plurality of instructions; and the processor 1410 coupled to the memory 1420 and configured to execute the instructions to: determine feedback type information and/or delay information when data is transmitted by a network device; and determine a reliability grade of a feedback transmission or that the feedback transmission is exempted at a certain situation, according to the delay information and/or the feedback type information.

In some embodiments where the device 1400 acts as a network device. For example, the memory 1420 stores a plurality of instructions; and the processor 1410 coupled to the memory 1420 and configured to execute the instructions to: transmit data to a terminal device; a reliability grade of a feedback transmission is determined by the terminal device or it is determined that the feedback transmission is exempted at a certain situation, according to delay information and/or feedback type information.

The PROG 1440 is assumed to include program instructions that, when executed by the associated DP 1410, enable the device 1400 to operate in accordance with the embodiments of the present disclosure, as discussed herein with the method 200 or 1000. The embodiments herein may be implemented by computer software executable by the DP 1410 of the device 1400, or by hardware, or by a combination of software and hardware. A combination of the data processor 1410 and MEM 1420 may form processing means 1450 adapted to implement various embodiments of the present disclosure.

The MEM 1420 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1400, there may be several physically distinct memory modules in the device 1400. The DP 1410 may be of any type suitable to the local technical environment, and may include one or more of general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method in a terminal device for transmitting feedback information, comprising:
   determining feedback type information and delay information when data is transmitted by a network device, the delay information being determined by a service type and a channel type of the data, the delay information being different for different services and logic channels of the data;
   determining a reliability grade of a feedback transmission or that the feedback transmission is exempted at a certain situation, according to the delay information and the feedback type information; and
   initiating a first timer according to a transmission timing of the data, a value of the first timer being determined by the delay information, it being determined that a hybrid automation repeat request (HARQ) feedback is exempted when the first timer expires, and it being determined that the HARQ feedback is to be transmitted with a second reliability grade which is higher than a first reliability grade when the first timer does not expire, the second reliability grade being used when the delay information is lower than a delay budget.

2. The method according to claim 1, wherein
   it is determined that the HARQ feedback is to be transmitted with a first reliability grade when the first timer expires.

3. The method according to claim 1, wherein the feedback type information comprises at least one of hybrid automation repeat request (HARQ) acknowledge (ACK) and HARQ non-acknowledge (NACK).

4. The method according to claim 3, wherein at least one of:
   it is determined that an HARQ feedback is to be transmitted with a second reliability grade which is higher than a first reliability grade when the feedback type information is HARQ NACK; and
   it is determined that the HARQ feedback is to be transmitted with the first reliability grade when the feedback type information is not HARQ NACK.

5. The method according to claim 4, wherein first resources for the HARQ feedback with the first reliability grade are different from second resources for the HARQ feedback with the second reliability grade.

6. The method according to claim 5, wherein the first resources are allocated in a first carrier and the second resources are allocated in a second carrier which is different from the first carrier.

7. The method according to claim 5, wherein an HARQ NACK is carried in the second resources by using a contention-based transmission.

8. A method in a network device for receiving feedback information, the method comprising:
   transmitting data to a terminal device;
   a reliability grade of a feedback transmission being determined by the terminal device or it is determined that the feedback transmission is exempted at a certain situation, according to delay information and feedback type information, the delay information being determined by a service type and a channel type of the data, the delay information being different for different services and logical channels of the data;
   initiating a second timer according to a transmission timing of the data, a value of the second timer being determined by the delay information; and
   determining that an HARQ feedback is exempted when the second timer expires, and it being determined that the HARQ feedback is to be received with a second reliability grade which is higher than a first reliability grade when the second timer does not expire, the second reliability grade being used when the delay information is lower than a delay budget.

9. The method according to claim 8, wherein the method further comprising:
   receiving a hybrid automation repeat request (HARQ) feedback with a first reliability grade or an HARQ feedback with a second reliability grade which is higher than the first reliability grade.

10. The method according to claim 8, wherein the feedback type information comprises at least one of hybrid automation repeat request (HARQ) acknowledge (ACK) and HARQ non-acknowledge (NACK).

11. The method according to claim 9, wherein first resources for the HARQ feedback with the first reliability grade are different from second resources for the HARQ feedback with the second reliability grade.

12. The method according to claim 11, wherein the method further comprising:
    decoding the HARQ feedback in the first resources;
    determining a retransmission is to be performed when an HARQ NACK is detected in the first resources; and
    determining the HARQ feedback by detecting in the second resources when an HARQ NACK is not detected in the first resources.

13. The method according to claim 11, wherein the method further comprising:
    soft combining signals in the first resources and the second resources when an HARQ ACK is not detected in the first resources.

14. A terminal device, comprising a processor and a memory, the memory containing instructions executable by the processor for transmitting feedback information, by causing the terminal device to:
    determine feedback type information and delay information when data is transmitted by a network device, the delay information being determined by one of a service type and a channel type of the data, the delay information being different for different services and logic channels of the data;
    determine a reliability grade of a feedback transmission or that the feedback transmission is exempted at a certain situation, according to the delay information and the feedback type information; and
    initiate a first timer according to a transmission timing of the data, a value of the first timer being determined by the delay information, it being determined that a hybrid automation repeat request (HARQ) feedback is exempted when the first timer expires, and it being determined that the HARQ feedback is to be transmitted with a second reliability grade which is higher than a first reliability grade when the first timer does not expire, the second reliability grade being used when the delay information is lower than a delay budget.

* * * * *